(12) United States Patent
Ogasawara (10) Patent No.: US 8,301,857 B2
(45) Date of Patent: Oct. 30, 2012

(54) WRITING TO FILE BY MULTIPLE APPLICATION THREADS IN PARALLEL

(75) Inventor: Takeshi Ogasawara, Tokyo-to (JP)

(73) Assignee: International Business Machines Corporation, Armonk, NY (US)

( * ) Notice: Subject to any disclaimer, the term of this patent is extended or adjusted under 35 U.S.C. 154(b) by 1777 days.

(21) Appl. No.: 11/241,326

(22) Filed: Oct. 1, 2005

(65) Prior Publication Data

US 2007/0079061 A1    Apr. 5, 2007

(51) Int. Cl.
*G06F 11/30* (2006.01)

(52) U.S. Cl. .......... 711/170; 711/173; 714/45; 717/128; 717/129

(58) Field of Classification Search ............... None
See application file for complete search history.

(56) References Cited

U.S. PATENT DOCUMENTS

| | | | |
|---|---|---|---|
| 6,493,837 B1 * | 12/2002 | Pang et al. | 714/45 |
| 6,754,890 B1 * | 6/2004 | Berry et al. | 717/128 |
| 2004/0181635 A1 * | 9/2004 | Huras et al. | 711/151 |

OTHER PUBLICATIONS

Peter F. Sweeney et al., Using Hardware Performance Monitors to Understand the Behavior of Java Applications, USENIX Proceedings, VM, 2004.

* cited by examiner

*Primary Examiner* — Kevin Ellis
*Assistant Examiner* — Alan Otto
(74) *Attorney, Agent, or Firm* — Vazken Alexanian

(57) ABSTRACT

Multiple application threads write to the same file in parallel. The file is written to on a file cluster-by-file cluster basis. For each file cluster of a number of file clusters of the file, a block of a memory cluster is allocated to an application thread, where the memory cluster corresponds to the file cluster, and the block is written to by the application thread until the block is finished, until all the blocks of the memory cluster are finished. A block may be finished where the application thread has completely written to the block, or the application thread has no further data to write to the block. Thereafter, the memory cluster is registered within a queue, from which it is read by a file writer thread, which writes the memory cluster to the file cluster. Each application thread that is to write to the file performs this process.

16 Claims, 4 Drawing Sheets

WRITING TO FILE BY MULTIPLE APPLICATION THREADS IN PARALLEL

FIELD OF THE INVENTION

The present invention relates generally to writing to a file on a storage device, such as a hard disk drive, and more particularly to writing to the file by multiple application threads in parallel.

BACKGROUND OF THE INVENTION

Storage device performance, such as of a magnetic storage device like a hard disk drive, is typically slower than the performance of other components within a computing system, such as processors and semiconductor memories. Therefore, efficiently writing to a file on such a storage device is important for the overall performance of a computing system. That is, the storage device performance can be the limiting factor to the overall performance of a computing system.

In many types of computing systems, such as those running versions of the Java® computing platform, it is common for many application programs to run concurrently, simultaneously, or in parallel, on a computing system at the same time. Stated another way, it is common for many application threads to be running in parallel on a computing system at the same time. An application thread is a separately executable computer program process that can be part of a larger computer program process or computer program. For instance, a given application computer program may have more than one application thread to achieve the functionality of the computer program.

Furthermore, in some types of technical areas, such as numerical computation, it is common for parallel computer programs to perform large amounts of file input/output (I/O) in relation to files stored on a storage device. That is, such technical areas involve computer programs in which large amounts of data that are constantly written to and/or read from files stored on a storage device. In such technical areas, therefore, it is common for a number of application threads to simultaneously perform writing operations to a storage device on a large scale.

Within the prior art, usually if a number of application threads are simultaneously writing to a storage device, each application thread writes to a different file on the storage device. This is because if the threads were to simultaneously write to the same file on the storage device, exclusive access to the file among the threads would have to be synchronized, such that parallelism in the execution of the application threads would be sacrificed. To avoid reducing or eliminating concurrency in the execution of the application threads, therefore, the prior art typically provides for each application thread writing to a different file on the storage device.

However, having each application thread write to a different file on the storage device deleteriously affects storage device performance. Storage device performance, which is already inherently lower than processor or memory performance, is affected by head seek time. The head of a storage device is its read/write mechanism, which converts changes in the magnetic field of the material on the magnetic surface to electrical signals and vice versa. For instance, hard disk drives usually contain one head for each surface that can be read from and written to.

Head seek time thus is the delay that occurs from the head of a storage device moving from one position on the magnetic surface, where one file is currently being written to, to another position on the magnetic surface, where another file is currently being written to. Therefore, having multiple application threads write to multiple files on the storage device concurrently means that the head of the storage device has to constantly move among a number of different positions on the magnetic surface. The storage device, in other words, spends more time moving the head among the number of different positions on the magnetic surface, and less time actually writing data to these different positions.

Thus, writing to a magnetic storage device like a hard disk drive is relatively fast where no or minimal head seek is performed. By comparison, where there are many or constant head seeks, writing to the magnetic storage device becomes very slow. The prior art achieves multiple application threads writing to multiple files on the storage device to secure parallelism of the multiple threads, but this conventional approach means that storage device performance is severely degraded. Such problems are further exacerbated by redundant array of independent disks (RAID) approaches to writing data to hard disk drives, and striping approaches to writing to hard disk drives, which increases the number of head seeks even further.

For these and other reasons, there is a need for the present invention.

SUMMARY OF THE INVENTION

The present, invention relates to multiple application threads writing to the same file in parallel. A method of one embodiment of the invention is for writing to a file on a file cluster-by-file cluster basis. For each file cluster of a number of file clusters of the file, a block of a memory cluster is allocated to an application thread, where the memory cluster corresponds to the file cluster, and the block is written to by the application thread until the block is finished, until all the blocks of the memory cluster are finished. A block may be finished where the application thread has completely written to the block, or the application thread has no further data to write to the block. Thereafter, the memory cluster is registered within a queue, from which it is read by a file writer thread, which writes the memory cluster to the file cluster. The method is performed by each application thread that is to write to the file. The file clusters are clusters of a storage device like a hard disk drive, whereas the memory clusters are clusters of a memory like a semiconductor memory, where the hard disk drive has inherently lower performance than the memory.

In one particular embodiment, the file cluster is initially mapped to the memory cluster, where such mapping is capable of being accomplished such that the application threads are capable of allocating blocks particularly from this memory cluster within the computing system in conjunction with which the method is being performed. In another embodiment, memory clusters are not capable of being mapped to file clusters. In this embodiment, once an application thread has finished writing to a blocks of memory, this block is copied by the file writer thread to another block of memory, and this latter memory block is that which is written to the file cluster by the file writer thread.

Embodiments of the invention provide for advantages over the prior art. In particular, embodiments of the invention provide for a way for multiple application threads to write to the same file stored on a storage device like a hard disk drive, while maintaining the parallelism in execution of the multiple threads. By having the multiple application threads write to the same file as described above, head seek of the storage device is significantly reduced, increasing overall performance of the computing system itself. Furthermore, special operating systems or file systems are not required to achieve this reduction in head seek time of the storage device. Parallelism of the application threads is maintained because all the application threads are capable of writing to the file at the same time, without the need for synchronization and other exclusive access mechanisms. In addition, physical memory is efficiently used by embodiments of the invention.

Still other advantages, aspects, and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1:
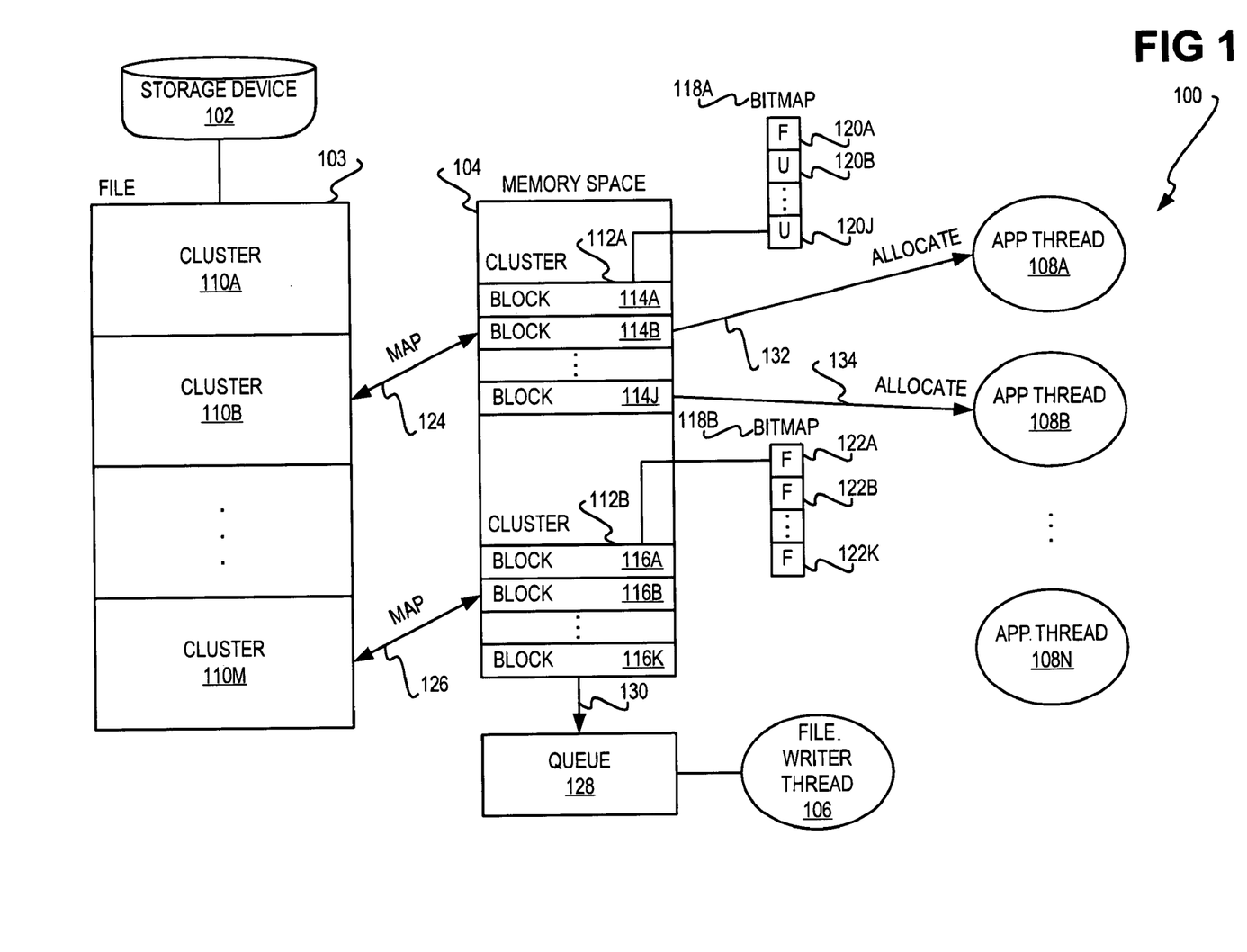
FIG. 1 is a diagram of a computing system in which multiple application threads are able to write to the same file in parallel, according to one embodiment of the invention, and is, suggested for printing on the first page of the patent.

FIG. 1 shows a computing system 100, according to an embodiment of the invention. The computing system 100 includes a storage device 102 and a memory space 104. The computing system 100 may further include other components, in addition to and/or in lieu of those depicted in FIG. 1, as can be appreciated by those of ordinary skill within the art. The storage device 102 is typically a magnetic storage device, such as a hard disk drive, which employs a head that has to be moved to different positions on a magnetic surface to write to and/or read from the magnetic surface. The memory space 104 is typically a semiconductor memory, such as dynamic random access memory (DRAM), and therefore has inherently better performance than the storage device 102 does.

A single file 103 is written to by a number of application threads 108A, 108B, . . . , 108N, collectively referred to as the application threads 108. The single file 103 may be a trace file in one embodiment of the invention. A trace file is a file that contains data which traces the execution of one or more application threads, such as the application threads 108. An application thread is a separately executable computer program process that can be part of a larger computer program process or computer program. For instance, a given application computer program may have more than one application thread to achieve the functionality of the computer program.

The file 103 is managed as a collection of file clusters 110A, 110B, . . . , 110M, collectively referred to as the file clusters 110. Each of the file clusters 110 has a suitable size, depending on the purpose of the file 103. For instance, where the file 103 is a trace file, the file cluster 110 may each have a size of thirty-two megabytes (MB). The file clusters 110 are used in order from top to bottom. A current cluster number denotes the position of a cluster that is to be used next.

The memory space 104 includes memory clusters 112A and 112B, collectively referred to as the memory clusters 112, which are mapped to the file clusters 110, such that the application threads 108 write to the memory clusters 112 in order to ultimately write to the file clusters 110 and thus to the file 103. As depicted in the example of FIG. 1, the file cluster 110B has been mapped to the memory cluster 112A, as indicated by the arrow 124, and the file cluster 110M has been mapped to the memory cluster 112B, as indicated by the arrow 126. The file cluster 110A is not mapped to any memory cluster in the example of FIG. 1. This may be because, for instance, the file cluster 110A has already had data stored therein.

The memory clusters 112 are divided into memory blocks. For instance, the memory cluster 112A is divided into memory blocks 114A, 114B, . . . , 114J, collectively referred to as the memory blocks 114, whereas the memory cluster 112B is divided into memory blocks 116A, 116B, . . . , 116K, collectively referred to as the memory blocks 116. The blocks 114 and 116 may each be two MB in size in one embodiment of the invention. The blocks 114 and 116 may be statically sized, such that they are each the same size, or dynamically sized, such that they may be differently sized. In the latter case, when a thread needs to write more data, it may request a larger-sized block, for instance, or a number of smaller-sized blocks. Each of the blocks 114 and 116 is allocated to one of the application threads 108, and the application threads 108 write to the memory clusters 112 by allocating memory blocks from the memory clusters 112. In this way, the blocks 114 and 116 are written to, such that the memory clusters 112 are written to, and ultimately the file clusters 110 of the file 103 are written to.

In the example of FIG. 1, the application thread 108A has been allocated the memory block 114B of the memory cluster 112A, as indicated by the arrow 132, while the application thread 108B has been allocated the memory block 114J of the memory cluster 112A, as indicated by the arrow 134. The application thread 108N has not been allocated any memory block of any of the memory clusters 112, because it may, for instance, not be currently writing to the file 103. The memory block 114A of the memory cluster 112A is not currently allocated to any of the application threads 108, because it has been completely written to, and is full. Likewise, the memory blocks 116 of the memory cluster 112B are not currently allocated to any of the application threads 108, because they are completely written to, and are full.

The clusters 112 have related bitmaps 118A and 118B, collectively referred to as the bitmaps 118, that indicate whether the memory blocks of the clusters 112 are finished. A memory block of a cluster is finished where it has been completely written to, and thus is full, or an application thread is finished writing the data in question, such that the memory block in question is finished, even though it may still be partially empty. The bitmap 118A contains bits 120A, 120B, ..., 120J, collectively referred to as the bits 120, and which correspond to the blocks 114 of the cluster 112A. The bitmap 118B contains bits 122A, 122B, ..., 122K, collectively referred to as the bits 122, and which correspond to the blocks 116 of the cluster 112B. A given bit of the bitmaps 118 can be one of two values, which is indicate in FIG. 1 as "F," such that the memory block corresponding to the bit is finished, and "U," such that the memory block corresponding to the bit is in use or can still be used (e.g., it may be empty).

The file writer thread 106 runs at a higher priority than the application threads 108. When a memory block of a memory cluster is finished, it is indicated as finished in the corresponding bitmap. When all the memory blocks of a memory cluster are finished, the memory cluster is added to, or registered in, a queue 128. It is noted that the memory cluster is not itself added to the queue 128, but rather an identification of or a reference to the memory cluster is added to or registered in the queue 128. In FIG. 1, for example, the memory cluster 112B has all of its blocks 116 finished, such that it has been registered within the queue 128, as indicated by the arrow 130.

The file writer thread 106 monitors the queue 128 for memory clusters that have been registered within the queue 128. When the queue 128 becomes non-empty, the file writer thread 106 reads the memory clusters from the queue 128 in a first-in, first-out (FIFO) manner. By reading a memory cluster from the queue 128, it is noted that the file writer thread 1106 reads the identification of or the reference to the memory cluster from the queue 128, and not the actual memory cluster itself. After reading a memory cluster from the queue 128, the file writer thread 106 causes the contents of the memory cluster in question to be written to the file cluster to which it corresponds. That is, the file writer thread 106 flushes the memory cluster to the file 103 stored on the storage device 102.

For example, in FIG. 1, the memory cluster 112B has been added to the queue. The file writer thread 106 therefore reads the memory cluster 112B (i.e., identifies the memory cluster 112B), and flushes the memory cluster 112B to the file cluster 110M to which it corresponds. The file writer thread 106 then indicates that the cluster 112B is no longer finished, by, for instance, changing the bits 122 of the bitmap 118B to read "U" instead of "F." The memory cluster 112B may be mapped to a different file cluster within the file 103, and the memory blocks 116 of the cluster 112 can then be allocated to the application thread 108 for writing to this new file cluster.

Respective areas of the file clusters 110 are thus sequentially used by the application threads 108. As a result, writing to the file 103, and hence to the storage device 102 itself, is performed sequentially. This limits to great extent the number of head seeks performed by the storage device 102. Therefore, performance of the storage device 102 is substantially at its maximum level, increasing the performance of the system 100 as a whole. At the same time, the application threads 108 still have their parallelism maintained, in that they are effectively able to write to the file 103 simultaneously or concurrently.

It is noted that in general application threads 108 can acquire (i.e., be allocated) memory blocks of the memory clusters of the memory space 104 on an as-needed basis. However, if a sufficient number of the threads 108 are writing to the memory space 104 for a sufficiently great length of time, the writing throughput to the memory space 104 is likely to exceed the writing throughput to the file 103 on the storage device 102. As a result, there will be a backlog of memory clusters within the queue 128, and, furthermore, more and more memory resources will be consumed by the application threads 108, to the point where an undesirable amount of such memory resources will be so consumed.

Therefore, the file writer thread 106 in one embodiment is able to manage the maximum, length of the queue 128, and thus able to manage the number of memory clusters that can be added to the queue 128. Such management can be accomplished by managing the writing rate of the application threads 108 to the memory space 104. Furthermore, where a used memory cluster is not able to be added to the queue 128, the system 100 can operate so that new memory blocks of new memory clusters cannot be made available and allocated to the application threads 108 until the queue can absorb the used memory cluster. In this way, the file writer thread 106 controls memory consumption by the application threads 108 in this embodiment, so that the file writer thread 106 is able to "catch up" with writing throughput to the memory space 104 by writing memory clusters to the file 103 of the storage device 102. Other approaches are also possible for the file writer thread 106 to manage writing throughput to the memory space 104, as will be described.

Figure 2:
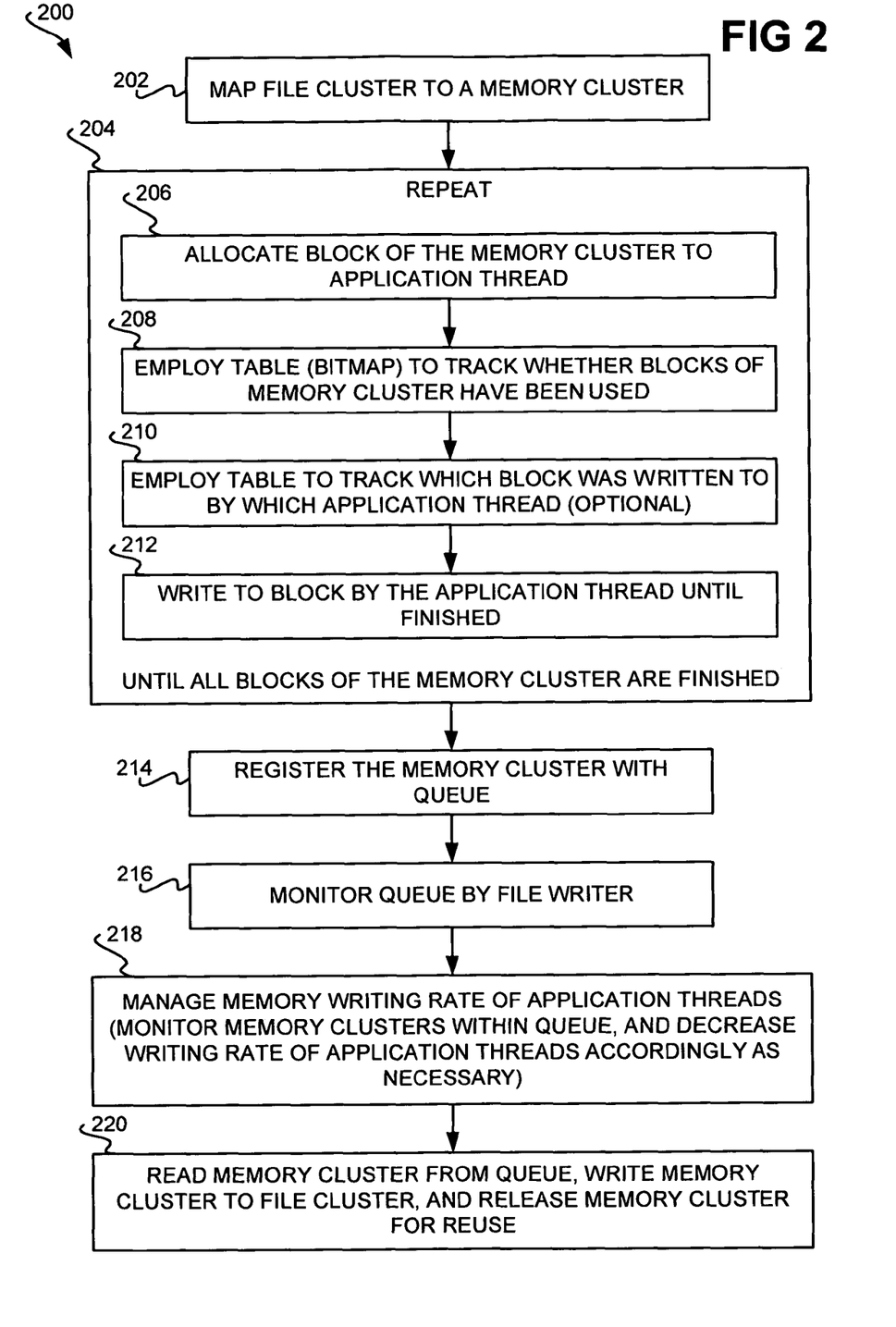
FIG. 2 is a method for multiple application threads writing to the same file in parallel in relation to the computing system of FIG. 1, according to an embodiment of the invention.

FIG. 2 shows a method 200 for writing to a file on a file cluster-by-file cluster basis by a number of application threads in parallel, in relation to the computing system 100 of FIG. 1, according to an embodiment of the invention. The method 200 is performed for each of the file clusters 110 of the file 103 stored on the storage device 102 of FIG. 1. First, a file cluster is mapped to a memory cluster (202). A memory-map function may be employed for this purpose. In the example of FIG. 1, for instance, the file cluster 110B has been mapped to the memory cluster 112A, while the file cluster 110M has been mapped to the memory cluster 112B.

Next, the following are repeated for the memory cluster in question, until all the blocks of the memory cluster are finished (204). First, when an application thread needs to write to the file 103, a memory block of the memory cluster is allocated to the application thread (206). In FIG. 1, for instance, the block 114B of the cluster 112A has been allocated to the application thread 108A, as indicated by the arrow 132, and the block 114J of the cluster 112A has been allocated to the application thread 108B, as indicated by the arrow 134.

A table, or bitmap, may be employed to track whether the blocks of the memory cluster have been used (208). For instance, the cluster 112A has the bitmap 118A to track whether the blocks 114 of the cluster 112A have been used. Furthermore, in one embodiment of the invention, a table may be employed to track which blocks were written to by which application threads (210). Such a table is not depicted in FIG. 1, and is not necessary in all embodiments of the invention, because the computing system 100 itself may inherently track which blocks have been written to by which application threads. Where such a table is used, identifiers corresponding to the application threads are employed to track which blocks were written to be which application threads. The application thread to which a block of the memory cluster has been allocated then writes to the memory block until it is finished (212), at which point the block of the memory cluster is indicated as being finished in its table or bitmap.

Once all the blocks of a memory cluster have been finished, as may be indicated by the bitmap for that memory cluster, the memory cluster is registered within the queue 128 (214). For instance, in the example of FIG. 1, the cluster 112B has all of its blocks 116 finished, as indicated by the bitmap 118B, such that it has been registered with the queue 128, as indicated by the arrow 130. The file writer thread 106 monitors the queue 128 to detect when a memory cluster has been registered within the queue 128 (216).

Furthermore, the file writer thread 106 manages the writing rate to the memory space 104 by or of the application threads 108 (218). For example, the file writer thread 106 may monitor the number of memory clusters within the queue 128. When the number exceeds a predetermined threshold, the file writer thread 106 may decrease the writing rate of the application threads 108 accordingly, so that the queue 128 is filled up at a slower rate. The file writer thread 106 further manages the length of the queue 128 in one embodiment in order to manage the writing rate of the application threads 108 to the memory space 104.

In one embodiment, the writing rate of the application threads 108 to the memory space 104 is decreased by employing a multiple-stage delay approach for each of the application threads 108. For example, in the case of a three-tier wait loop, there may be a spin loop cycle, a time cycle during which an application thread actually writes to the memory space 104, and a sleep cycle. In one embodiment, the application thread itself decreases its writing rate by increasing the usage of the sleep cycle in relation to the other two cycles. In another embodiment, the writing rate of the application threads 108 to the memory space 104 is decreased by lowering execution priorities of the application threads 108. For instance, an application thread may lower its own priority when sleeping, and then when exiting the sleep cycle raises its priority back again.

That all of the blocks of a memory cluster are finished can mean one of two things. First, all of the blocks of the memory cluster may have been completely written to. Second, the application threads writing to the blocks of the memory cluster may be finished writing data to the blocks, even though one or more of the blocks themselves have not been completely written to, because there is no further data to write to the block. That is, even if a block is not 100% used, it is still considered finished in such instances.

Ultimately, the file writer thread 106 reads the memory cluster for which all the blocks have been finished from the queue 128, writes the memory cluster to its mapped file cluster, and release the memory cluster for reuse, such as for mapping to a different file cluster (220). For example, in the case of the cluster 112B of FIG. 1, once it has been registered with the queue 128, the file writer thread 106 detects this registration. In response, file writer thread 106 reads the identity of the memory cluster 112B, in that it learns the identity of the memory cluster 112B that has been registered with the queue 128. The file writer thread 106 then writes the memory cluster 112B to its mapped file cluster 110M. For instance, the file writer thread 106 flushes the memory cluster 112B to the file cluster 110M. Finally, the file writer thread 106 releases the memory cluster 112B, such as by clearing its bitmap 118B, so that it can again be reused.

The embodiments of the invention that have been described in relation to FIGS. 1 and 2 employ an approach in which a memory cluster is initially mapped to a file cluster, and memory blocks are allocated from that memory cluster for direct writing to by the application threads. When a memory cluster is finished, the file writer thread flushes the memory cluster to the fluster cluster to which it has been mapped. However, in some types of systems, it may be undesirable or impossible to map memory clusters to file clusters, where memory blocks are directly allocated from the memory clusters for writing to by the application threads.

Figure 3:
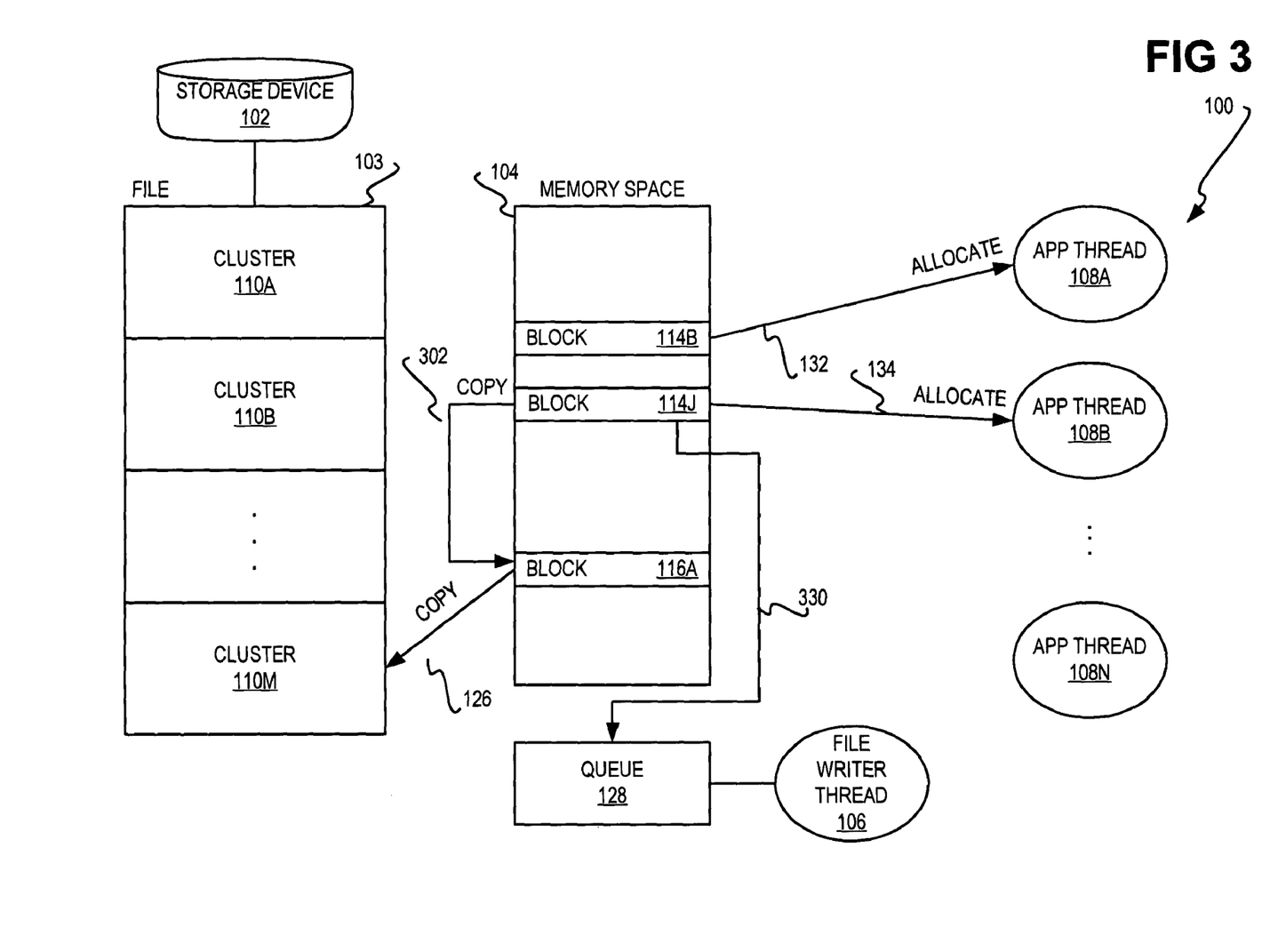
FIG. 3 is a diagram of a computing system in which multiple application threads are able to write to the same file in parallel, according to another embodiment of the invention.

FIG. 3 shows the computing system 100, according to such an embodiment of the invention. The computing system 100 operates in the embodiment of FIG. 3 as in the embodiment of FIG. 1, as has been described, with the following exceptions. First, the application threads 108 again allocate memory blocks 114, such as the blocks 114B and 114J as indicated in FIG. 3. However, the memory blocks 114 are not part of any memory cluster. Furthermore, memory clusters are not used in the embodiment of FIG. 3; rather, memory blocks are simply employed. Only the differences between FIGS. 1 and 3 are described in relation to FIG. 3, and otherwise it can be presumed that FIG. 3 operates the same way as FIG. 1 for those aspects of FIG. 3 that are not now particularly described.

When a block of memory is finished, it is registered with the queue 128, as opposed to an entire memory cluster being registered with the queue 128. In the example of FIG. 3, the block 114J has been finished, and it is registered with the queue 128 as before, as indicated by the arrow 330 in FIG. 3. The file writer thread 106, upon detecting the registration of the block 114J within the queue 128, cannot directly flush the block 114J to one of the file clusters 110, because there is no mapping of memory clusters the file clusters 110. Rather, the file writer thread 106 copies the block 114J to the block 116A, as indicated by the arrow 302. The file writer thread 106 then flushes this block 116A to the file cluster 110M; that is, the file writer thread 106 copies the block 116A to the cluster 110M.

Figure 4:
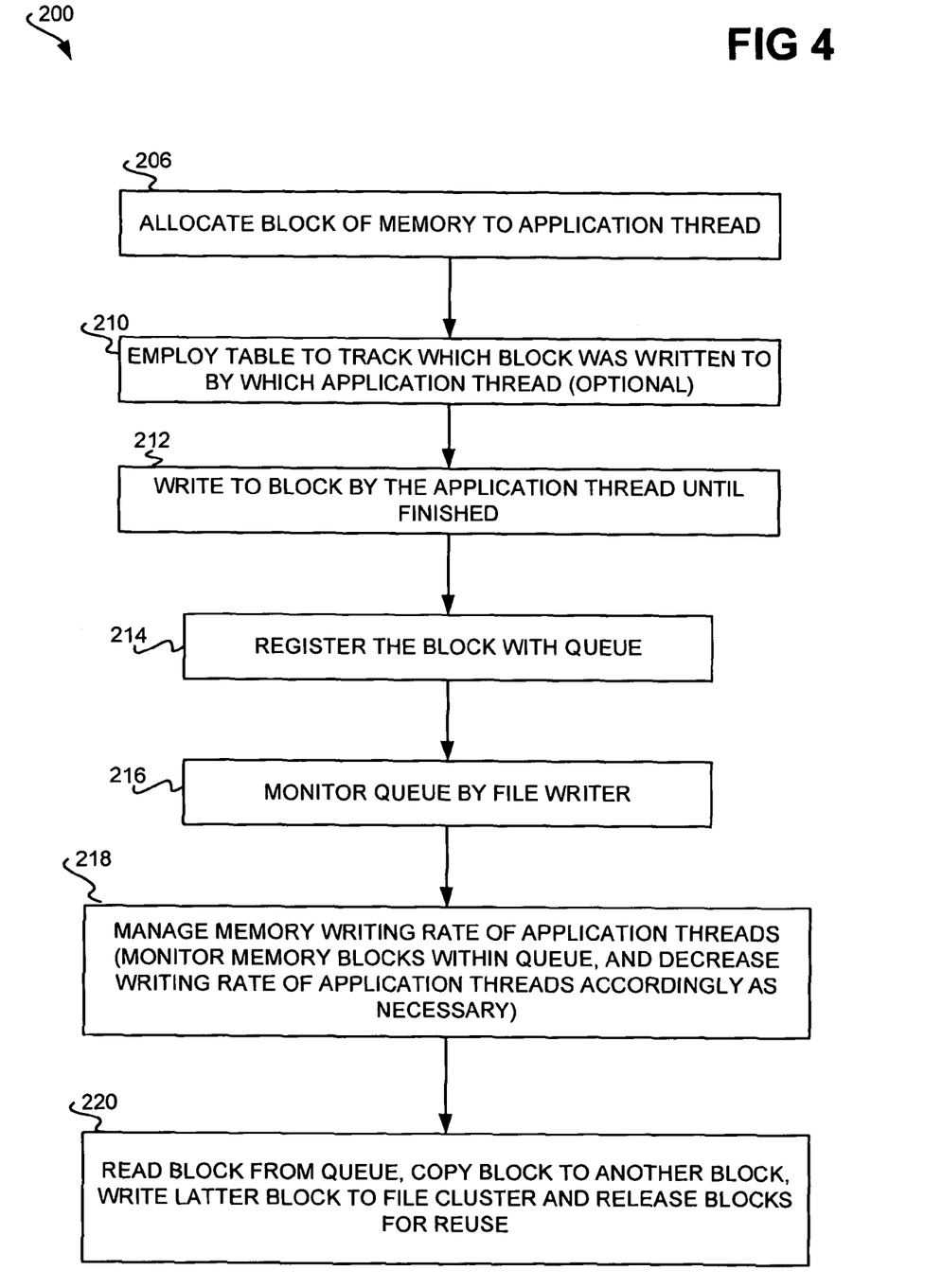
FIG. 4 is a method for multiple application threads writing to the same file in parallel in relation to the computing system of FIG. 3, according to an embodiment of the invention.

FIG. 4 shows the method 200 for writing to a file on a file cluster-by-file cluster basis by a number of application threads in parallel, but in relation to the computing system 100 of FIG. 3, according to an embodiment of the invention. The method 200 is again performed for each of the file clusters 110 of the file 103 stored on the storage device 102 of FIG. 3.

First, when an application thread needs to write to the file 103, a-memory block is allocated to the application thread (206). In FIG. 3, for instance, the block 114B has been allocated to the application thread 108A, as indicated by the arrow 132, and the block 114J has been allocated to the application thread 1089B, as indicated by the arrow 134.

In one embodiment, a table may again be employed to track which blocks were written to by which application threads (210), as has been described in relation to FIG. 2. Such a table is not depicted in FIG. 3, however. The application thread to which a block has been allocated then writes to the memory block until it is finished (212).

Once a block has been finished, the block is registered within the queue 128 (214). For instance, in the example of FIG. 3, once the block 114J it is registered with the queue 128, as indicated by the arrow 330. The file writer thread 106 monitors the queue 128 to detect when a memory block has been registered within the queue 128 (216). Furthermore, the file writer thread 106 manages the writing rate to the memory space 104 by or of the application threads 108 (218), as has been particularly described in relation to FIG. 2, and the description of which is not repeated here to avoid redundancy. However, the writing rate is managed by monitoring the number of blocks within the queue 128 in the method 400 of FIG. 4, as opposed to the number of memory clusters within the queue 128 as in the method 200 of FIG. 2.

Ultimately, the file writer thread 106 reads a block from the queue 128, copies the block to another block within the memory space 104, writes this latter block to the file cluster, and releases the blocks for reuse (220). For example, in the case of the block 114J of FIG. 3, once it has been finished and registered with the queue 128, the file writer thread 106 detects this registration. In response, the file writer thread 106 reads the identity of the block 114J, and copies the block 114J to the block 116A. The file writer thread 106 then writes the block 116A to the file cluster 110M, such as by flushing the 110 block 116A to the file cluster 110M. Finally, the file writer thread 106 releases the blocks 114J and 116A, so that they can again be reused.

Once a file cluster of the file clusters 110 has been completely written to, then the file writer thread 106 starts writing to the next file cluster. Therefore, whereas in the embodiment of the invention of FIGS. 1 and 2 writing to the file clusters 110 occurs on a memory cluster-by-memory cluster basis, in the embodiment of the invention of FIGS. 3 and 4 as has been described, writing to the file clusters 110 occurs on a memory block-by-memory block basis. That said, however, the embodiment of the invention of FIGS. 3 and 4 can nevertheless be modified so that writing to the file clusters 110 occurs on a memory cluster-by-memory cluster basis, as can be appreciated by those of ordinary skill within the art.

It is noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. For instance, the methods that have been described may be implemented by one or more computer programs. The computer programs may be stored on a computer-readable medium, such as a recordable data storage medium, or another type of computer-readable medium. Therefore, it is manifestly intended that this invention be limited only by the claims and equivalents thereof.

I claim:

1. A method for writing to a file on a file cluster-by-file cluster basis, by a plurality of application threads, comprising:
the application threads writing to the file by:
for each file cluster of a plurality of file clusters of the file:
mapping the file cluster to a memory cluster;
repeating:
allocating a block of the memory cluster to one of the application threads that is writing to the file cluster, the memory cluster corresponding to the file cluster;
writing to the file cluster by the one of the application threads via the one of the application threads writing to the block of the memory cluster until the block is finished,
until all blocks of the memory cluster are finished;
registering the memory cluster within a queue;
reading the memory cluster from the queue by a file writer thread; and,
writing the memory cluster to the file cluster by the file writer thread,
such that different of the application threads write to different of the file clusters of the file,
wherein the file cluster is mapped to the memory cluster prior to the blocks of the memory cluster being allocated and written to by the application threads.

2. The method of claim 1, further comprising employing a used-block management table to track whether each of a plurality of blocks of a memory cluster have been used.

3. The method of claim 1, further comprising employing a table to track which block was written to by which of the plurality of application threads.

4. The method of claim 1, further comprising monitoring the queue by the file writer thread to detect when a memory cluster has been registered within the queue.

5. The method of claim 1, further comprising releasing the memory cluster by the file writer thread so that the memory cluster is capable of being reused.

6. The method of claim 1, further comprising the file writer thread managing a writing rate of the plurality of application threads.

7. The method of claim 6, wherein the file writer thread managing the writing rate of the plurality of application threads comprises:
the file writer thread monitoring a number of memory clusters within the queue; and,
where the number of memory clusters within the queue is greater than a predetermined number, the file writer thread decreasing the writing rate by the plurality of application threads.

8. The method of claim 7, wherein the file writer thread decreasing the writing rate of the plurality of application threads comprises employing a multi-stage delay approach for each of the application threads to decrease the writing rate.

9. The method of claim 7, wherein the file writer thread decreasing the writing rate of the plurality of application threads comprises lowering execution priorities of the application threads.

10. The method of claim 1, wherein the application thread writes to the block until the block is finished such that the application thread writes to the block until the block is full.

11. The method of claim 1, wherein the application thread writes to the block until the block is finished such that the application thread writes to the block until the application thread has no further data to write to the block.

12. The method of claim 1, wherein the file writer thread has a higher execution priority than the application thread.

13. The method of claim 1, wherein the file is a trace file.

14. The method of claim 1, wherein the blocks are dynamically sized.

15. A computer-readable medium storing a computer program to implement a method for writing to a file on a file cluster-by-file cluster basis, by a plurality of application threads, comprising:
the application threads writing to the file by:
for each file cluster of a plurality of file clusters of the file:
mapping the file cluster to a memory cluster;
repeating:
allocating a block of the memory cluster to one of the application threads that is writing to the file cluster, the memory cluster corresponding to the file cluster;
writing to the file cluster by the one of the application threads via the one of the application threads writing to the block of the memory cluster until the block is finished,
until all blocks of the memory cluster are finished;
registering the memory cluster within a queue;
reading the memory cluster from the queue by a file writer thread; and,
writing the memory cluster to the file cluster by the file writer thread,
such that different of the application threads write to different of the file clusters of the file,
wherein the file cluster is mapped to the memory cluster prior to the blocks of the memory cluster being allocated and written to by the application threads.

16. The computer-readable medium of claim 15, the method further comprising:

the file writer thread monitoring a number of memory clusters within the queue; and, where the number of memory clusters within the queue is greater than a predetermined number, the file writer thread decreasing the writing rate of the plurality of application threads.

* * * * *